US012807223B2

(12) United States Patent
Kodappully et al.

(10) Patent No.: US 12,807,223 B2
(45) Date of Patent: Nov. 24, 2026

(54) UNDERSTEER OVERSTEER FEEL MODIFICATION

(71) Applicant: Steering Solutions IP Holding Corporation, Saginaw, MI (US)

(72) Inventors: Sarin Kodappully, Midland, MI (US); Karthik Rengarajan, Rochester Hills, MI (US); Scott T. Sanford, Swartz Creek, MI (US); Sujay Yegateela, Auburn Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 87 days.

(21) Appl. No.: 18/945,060

(22) Filed: Nov. 12, 2024

(65) Prior Publication Data

US 2025/0178664 A1 Jun. 5, 2025

Related U.S. Application Data

(60) Provisional application No. 63/605,166, filed on Dec. 1, 2023.

(51) Int. Cl.
*B62D 6/00* (2006.01)

(52) U.S. Cl.
CPC .................................... *B62D 6/008* (2013.01)

(58) Field of Classification Search
CPC ...................................................... B62D 6/008
See application file for complete search history.

(56) References Cited

U.S. PATENT DOCUMENTS

| | | | | |
|---|---|---|---|---|
| 5,774,819 A * | 6/1998 | Yamamoto | B62D 6/008 | 701/41 |
| 6,823,245 B2 * | 11/2004 | Sugitani | B60T 8/172 | 701/33.9 |
| 7,383,111 B2 * | 6/2008 | Takimoto | B62D 6/008 | 701/1 |
| 12,330,727 B2 * | 6/2025 | Im | B62D 15/0225 | |

FOREIGN PATENT DOCUMENTS

JP 2023041176 A * 3/2023

OTHER PUBLICATIONS

Hasegawa, JP 2023-041176, machine translation. (Year: 2023).*

* cited by examiner

*Primary Examiner* — Mark L. Greene
(74) *Attorney, Agent, or Firm* — Dickinson Wright PLLC

(57) ABSTRACT

A method for controlling handwheel torque in a steering system of a vehicle includes obtaining at least one of a reference yaw rate of the vehicle and a reference yaw acceleration of the vehicle, obtaining at least one of a yaw rate error and a yaw acceleration error based on the at least one of the reference yaw rate and the reference yaw acceleration, obtaining a handwheel torque modifier based on the at least one of the yaw rate error and the yaw acceleration error, adjusting a reference torque using the handwheel torque modifier, and controlling the handwheel torque using the reference torque as adjusted using the handwheel torque modifier.

18 Claims, 5 Drawing Sheets

UNDERSTEER OVERSTEER FEEL MODIFICATION

CROSS-REFERENCE TO RELATED APPLICATIONS

This application claims the benefit of U.S. Provisional Application No. 63/605,166, filed on Dec. 1, 2023. The entire disclosure of the application referenced above is incorporated herein by reference.

TECHNICAL FIELD

This disclosure relates to systems and methods for controlling steering feel and driver feedback in steering systems.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY

This disclosure relates generally to systems and methods for controlling steering feel and driver feedback in steering systems.

An aspect of the disclosed embodiments includes a method for controlling handwheel torque in a steering system of a vehicle. The method includes obtaining at least one of a reference yaw rate of the vehicle and a reference yaw acceleration of the vehicle, obtaining at least one of a yaw rate error and a yaw acceleration error based on the at least one of the reference yaw rate and the reference yaw acceleration, obtaining a handwheel torque modifier based on the at least one of the yaw rate error and the yaw acceleration error, adjusting a reference torque using the handwheel torque modifier, and controlling the handwheel torque using the reference torque as adjusted using the handwheel torque modifier.

In another aspect, a system is configured to perform one or more functions of the various methods described herein. In another aspect, a processor is configured to execute instructions stored in memory to perform one or more functions of the various methods described herein.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
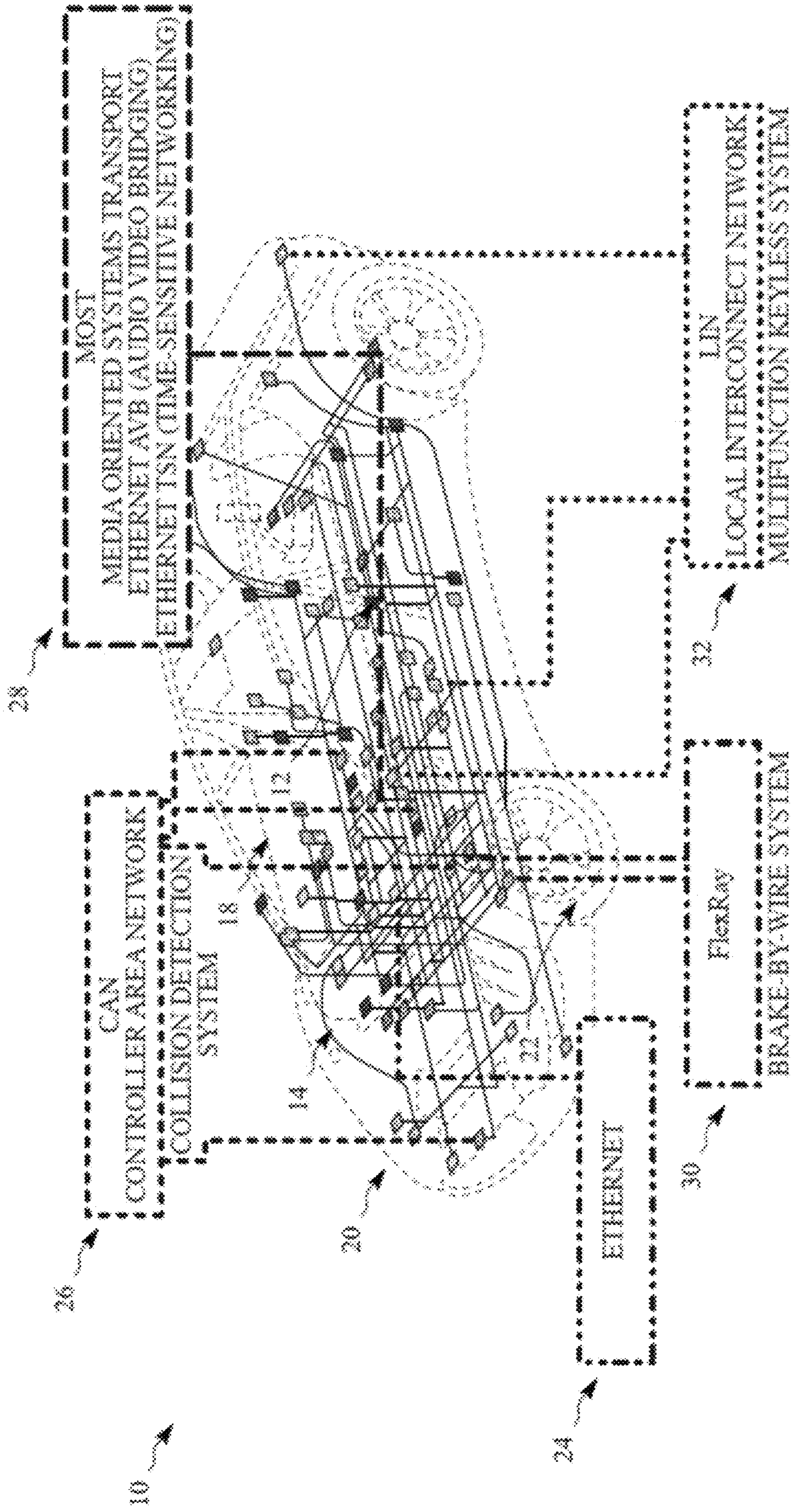
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

A SbW steering system may include at least one handwheel actuator (HWA), such as a steering wheel, which is used by a driver to control the vehicle laterally, and at least one roadwheel actuator (RWA), which is used to control a steered axle of the vehicle and create lateral motion of the vehicle responsive to movement of the HWA. A SbW system may further include a controller, such as a domain controller, configured to store and execute control logic.

SbW and other types of steering systems may be configured to provide steering feedback, such as torque or other feedback, to a driver. For example, forces and moments at front tire contact patches are transferred through the tire carcass, wheels, hubs, kingpins, tie rods, and into the steering rack, measured/determined by the RWA and an associated controller (e.g., an ECU), transmitted to an HWA controller, and provided to the driver as handwheel torque feedback. In a connected or SbW system, this feedback can give the driver tactile information indicating whether the car has reached limit understeer or US (e.g., a condition where front tires lose traction prior to rear tears) or limit oversteer or OS (e.g., a condition where rear tires lose traction prior to front tires). Certain vehicle chassis configurations may not generate sufficient torque feedback in the handwheel to determine limit conditions. SbW system characteristics may not allow for the generation of sufficient torque feedback in the handwheel to determine limit conditions. Lack of adequate steering feedback for limit conditions may adversely impact the ability of the driver to control the vehicle.

In one example, a steering system may calculate a driver intended yaw rate and yaw acceleration from a roadwheel angle and vehicle speed. Yaw rate and yaw acceleration errors can be calculated using the driver intended yaw rate and yaw acceleration and the actual vehicle yaw rate and yaw acceleration. State flags can be set based on the yaw rate and yaw acceleration errors and calibratable thresholds (e.g., based on whether the errors reach/exceed respective thresholds). Rack force calculation can be either switched or blended between two different rack force calculation methods based on whether various state flags are set. The calculated rack force can be used as an input into handwheel torque calculation. However, in this example, the handwheel torque may not be adjusted directly and instead is only adjusted indirectly through adjustments to the rack force. In other words, the rack force calculation is only adjusted to values that are between the different rack force calculation methods (i.e., the adjustments to rack force and handwheel torque are bounded). Accordingly, this example steering system may be suitable for steering systems in which a rack force is calculated (e.g., in SbW systems), but not for systems in which the rack force is physically transmitted to the handwheel (e.g., traditional EPS systems).

Steering modification (e.g., handwheel torque control) systems and methods according to the present disclosure are configured to provide or exaggerate tactile feedback to the driver, via handwheel torque, to indicate that the vehicle is in a physical state of limit understeer or oversteer. In this manner, the driver is provided with sufficient information for making steering decisions during limit understeer or limit oversteer events. In an example, systems and methods described herein are configured to calculate and control tactile feedback provided to the driver using yaw rate, yaw rate error, yaw acceleration, and yaw acceleration error. As one example, handwheel torque modifiers or scalars are calculated based on yaw rate error and yaw acceleration error and applied to a handwheel target or reference torque to scale/adjust the reference torque upward (e.g., during oversteer events) or downward (e.g., during understeer events). Further, a handwheel torque modifier can be selectively calculated and applied to damping and return correction (e.g., constant velocity return, or CVR) calculations/adjustments.

FIG. 1A generally illustrates a vehicle 10 according to the principles of the present disclosure. The vehicle 10 may include any suitable vehicle, such as a car, a truck, a sport utility vehicle, a minivan, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semiautonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media-oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 1B:
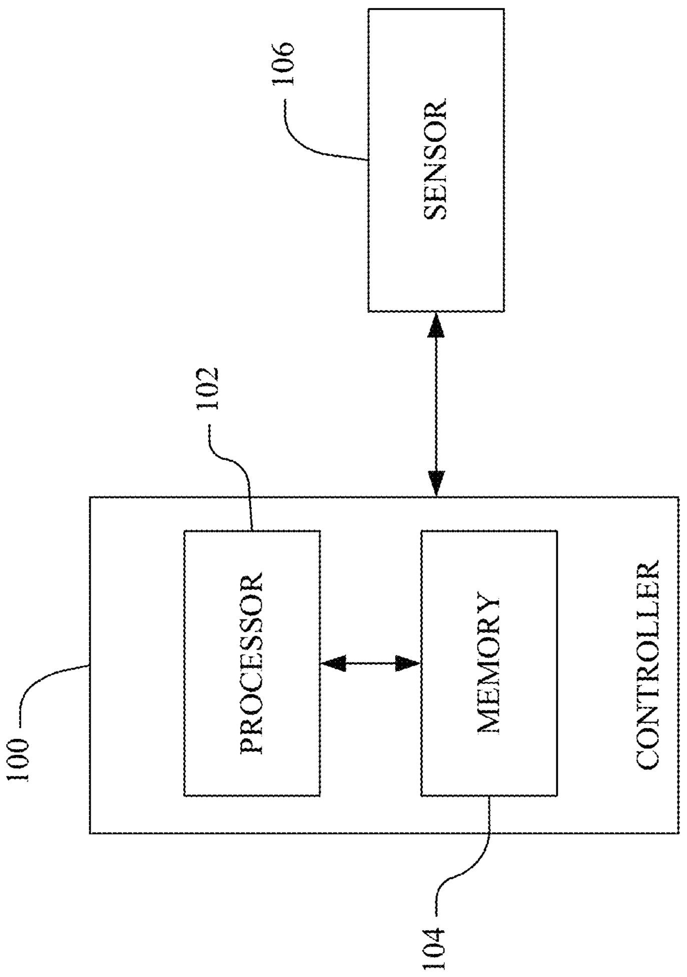
FIG. 1B generally illustrates a controller according to the principles of the present disclosure.

In some embodiments, the vehicle 10 includes one or more controllers, such as controller 100, as is generally illustrated in FIG. 1B. The controller 100 may correspond to a steering system controller. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

As used herein, "controller" may refer to a hardware module or assembly including one or more processors or microcontrollers, memory, sensors, one or more actuators, a communication interface, etc., any portions of which may be collectively referred to as "circuitry." As described herein, respective functions and steps performed by a given controller, control circuitry, etc. may be collectively performed by multiple controllers, processors, etc. For example, a processor, processing device, controller, control circuitry, etc. "configured to perform" may refer to a single processor, processing device, controller, etc. configured to perform both A and B or may refer to a first processor, processing device, controller, etc. configured to perform A and a second processor, processing device, controller, etc. configured to perform B. For simplicity, "control circuitry configured to perform A and B" may refer to a single or multiple processors, processing devices, controllers, etc. collectively configured to perform A and B.

In some embodiments, the controller 100 may perform the methods described herein. However, the methods described herein as performed by the controller 100 are not meant to be limiting, and any type of software executed on a controller, processor, or other circuitry can implement the hysteresis shaping techniques described herein without departing from the scope of this disclosure. For example, a controller, such as a processor executing software within a computing device, can implement the systems and methods described herein.

Figure 2A:
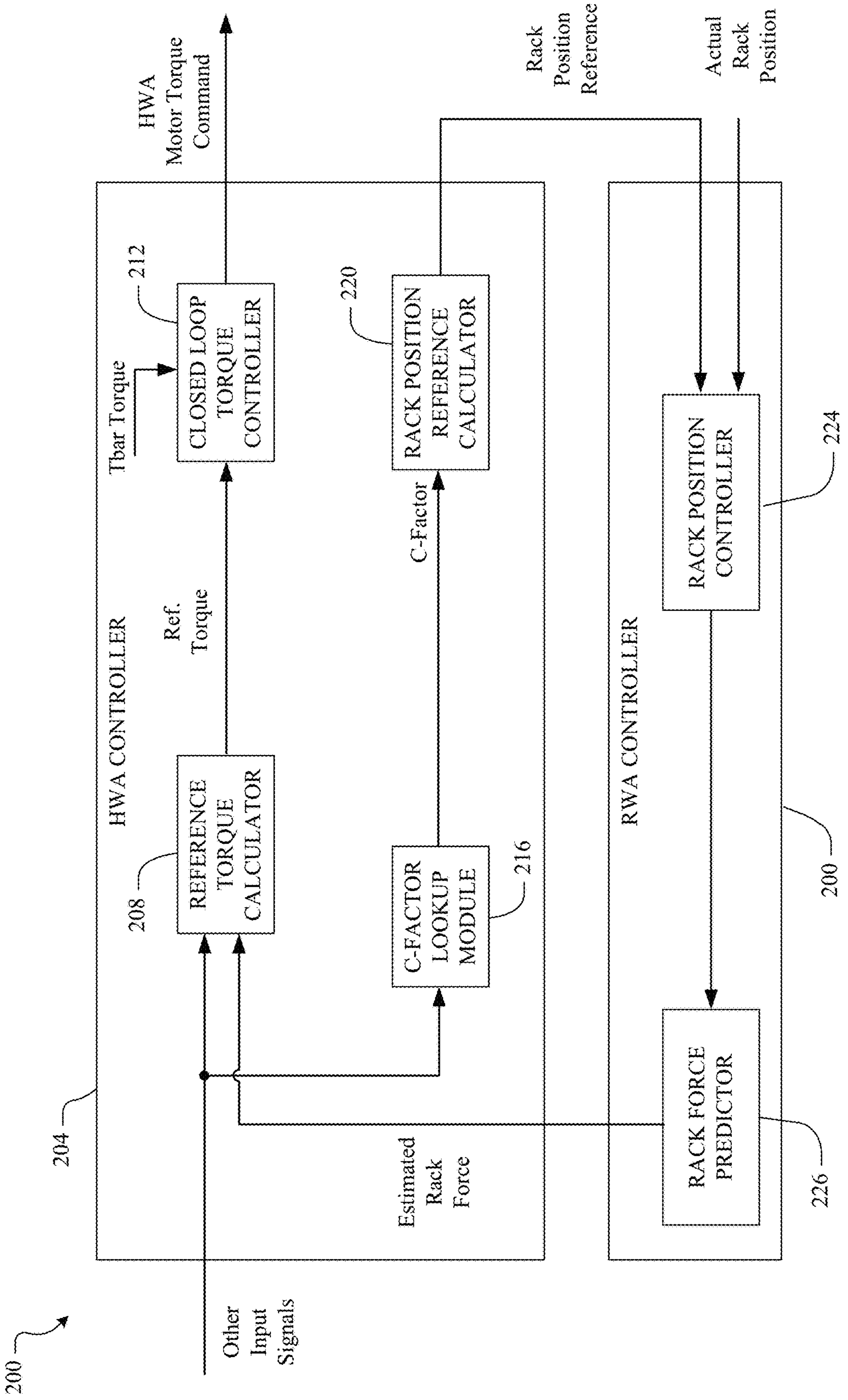
FIG. 2A generally illustrates an example rack or RWA controller and column or handwheel actuator (HWA) of a steering system according to the principles of the present disclosure.

FIG. 2A illustrates an example steering system 200 including a rack or RWA controller 202 and column or handwheel actuator (HWA) controller 204 of a steering system configured to implement steering modification techniques according to the present disclosure. For example, the HWA controller 204 is configured to generate a handwheel actuator (HWA) motor torque command based on an estimated rack force (e.g., an estimated rack force signal) received from the RWA controller 202 and one or more other input signals (e.g., vehicle speed, handwheel position, and handwheel velocity). The RWA controller 202 is configured to determine the estimated rack force based on the motor torque required to achieve or maintain an actual rack position. The controllers 200 and 204 may correspond to, be implemented by, etc. one or more steering system controllers.

As one example, the HWA controller 204 includes a reference torque calculator 208 configured to calculate a reference torque ($T_{ref}$) based on the estimated rack force and the one or more other input signals. For example, the reference torque corresponds to a sum of various inputs/measurements such as effort, hysteresis, return correction or CVR, damping, catch, etc. A closed loop (e.g., a PID closed loop) torque controller 212 is configured to generate and output the motor torque command based at least in part on a force or torque applied by the driver (e.g., "Tbar torque") and the reference torque. The motor torque command is provided as a control signal to control a motor of the handwheel actuator.

The estimated rack force corresponds to the measured or estimated roadwheel actuator motor torque. Accordingly, the estimated rack force (and any estimated rack force offset or error) is a critical factor for determining the force provided by the motor of the handwheel actuator.

In some examples, the HWA controller 204 may further include a C-factor lookup module 216 and a rack position reference calculator 220. For example, the rack position reference calculator 220 is configured to generate the rack position reference based on a C-factor received from the C-factor lookup module 216. The C-factor may be determined based on a handwheel angle ("HwAg") corresponding to driver input (e.g., a handwheel angle indicating driver intent conveyed via the handwheel). Example systems and methods for obtaining the rack position reference and the C-factor are described in more detail in U.S. patent application Ser. No. 18/318,657, filed on May 16, 2023, the entire contents of which are incorporated herein by reference.

The RWA controller 202 includes a rack position controller 224 (e.g., a PID rack position controller) configured to generate one or more rack position control signals based on the actual rack position and the rack position reference (e.g., based on a difference between the actual rack positon and the rack position reference). For example, the rack position control signals may include, but are not limited to, rack motor velocity and motor torque command (e.g., indicative of an amount of torque applied by the driver) signals. In this manner, rack position is controlled to follow the intent of the driver (as indicated by the rack reference position).

A rack force predictor 226 generates the estimated rack force based on outputs of the rack position controller 224 (e.g., based on a function of the rack motor velocity, the rack motor torque command, etc.). In various examples, the estimated rack force may be calculated based on the amount of torque applied to the handwheel by the driver (as indicated by the rack motor torque command, various sensor signals, etc.). As shown, the rack force predictor 226 may output the estimated rack force and the reference torque calculator 208 (and/or another component of the RWA controller 202, the HWA controller 204, etc.) may obtain an estimated rack load based on the estimated rack force. In other examples, the rack force predictor 226 may output the estimated rack load. In some contexts, the terms "estimated rack force" and "estimated rack load" may be used interchangeably.

For example, for RWA position control, the rack position reference signal ("RackPosRef") may be calculated based on a position error ("PosErr") between an ADAS rack position reference value or signal ("ADASRackPosRef") and an HWA rack position reference value or signal ("HWARackPosRef"). Conversely, HWA position control is based on a position error between the HWA position and the RWA position, such that the handwheel can be controlled to rotate in a manner consistent with rotation of the roadwheel in hands-off conditions.

The reference torque may correspond to a desired, ideal, or target torque to be felt by the driver (i.e., at the handwheel/steering wheel). As described above, the reference torque is calculated based on inputs including, but not limited to, driver input (e.g., an input torque, corresponding to steering handwheel angle), road conditions, damping, hysteresis, etc. A torque at the handwheel is controlled (e.g., via the HWA) to match the reference torque. For example, outputs of one or more sensors measuring actual torque at the wheel are used to minimize the difference between the reference torque and the actual torque.

An effort function (e.g., an effort function implemented by the reference torque calculator 208) defines a relationship between driver input (e.g., the force or torque applied by the driver to the handwheel, which may be referred to as "effort") and a response (i.e., movement) of the steering system. For example, the effort function may output an effort value based on a lookup table or other function (e.g., by using an estimated rack load as an input). The estimated rack load may be modified prior to being input to the lookup table by adding a calculated return load value to the estimated rack load. The effort function indicates an amount of effort required by the driver to cause a desired response.

The steering system 200 according to the present disclosure is configured to implement steering modification (e.g., understeer/oversteer modification) techniques as described below in more detail. For example, the steering system 200 may include a linear bicycle model that is optimized for a yaw rate prediction to generate at least one of an expected/reference yaw rate and yaw acceleration based on vehicle speed and roadwheel angle. Expected/reference yaw rate and yaw acceleration provide an indication of the presence of understeer or oversteer. The linear bicycle model is one example model that can be used to represent expected behavior of the vehicle as perceived by a driver, but other types of models may be used. An understeer/oversteer detection module or circuitry compares at least one of the actual yaw rate and yaw acceleration of the vehicle to the at least one of the reference yaw rate and acceleration generated by the linear bicycle model and calculates the yaw rate error and yaw acceleration error accordingly (i.e., based on differences between expected/reference and actual yaw rate and acceleration). A handwheel torque modifier calculation module or circuitry receives the yaw rate and yaw acceleration errors and calculates a modifier (e.g., a handwheel torque modifier) to apply to handwheel torque (e.g., further dependent upon a physical event or state of the vehicle).

Figure 2B:
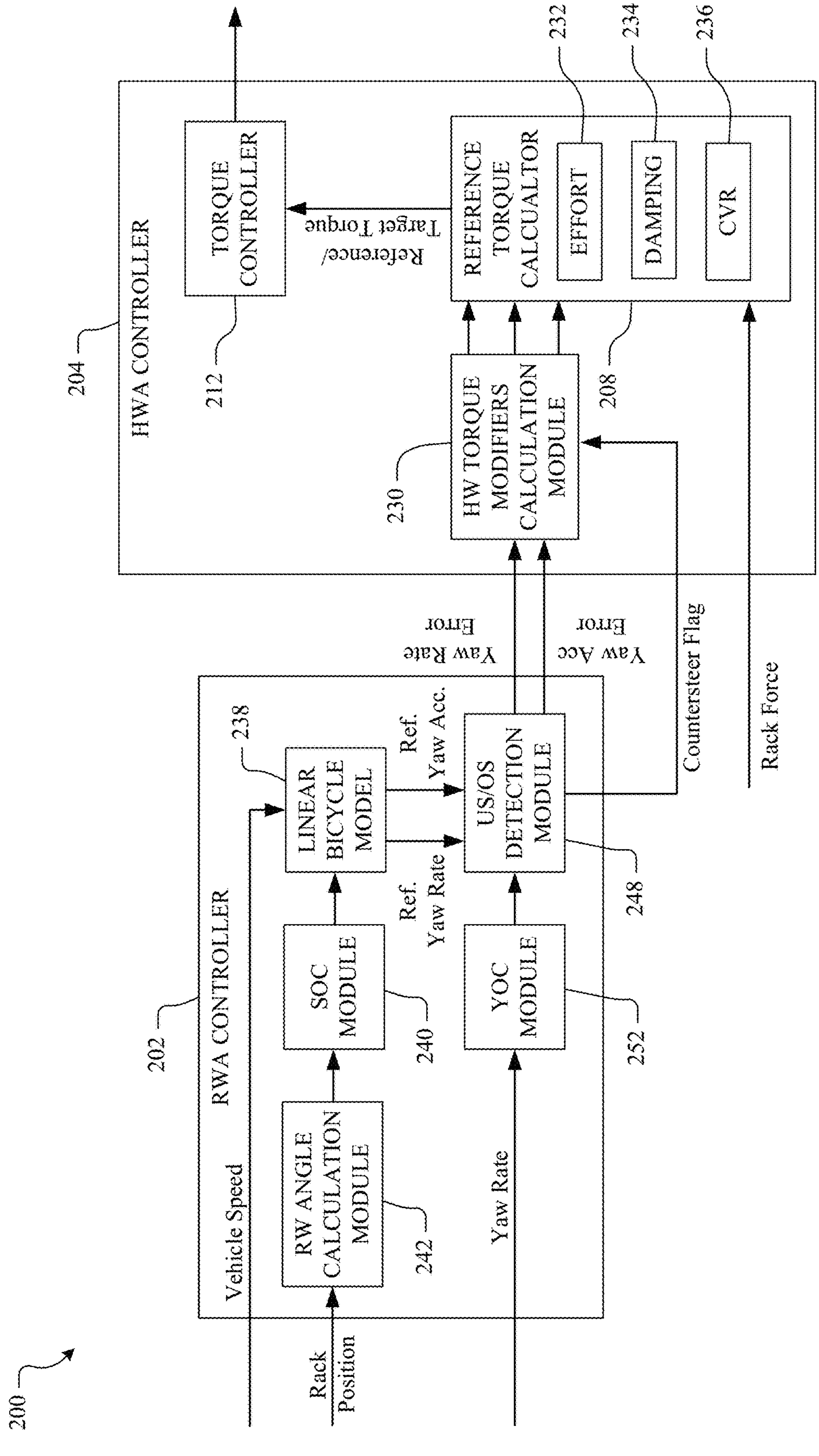
FIG. 2B illustrates a functional block diagram of an example steering modification system according to the principles of the present disclosure.

FIG. 2B illustrates another example of the steering system 200 described above in FIG. 2A. The steering system 200 includes various components configured to implement the steering modification techniques according to the principles of the present disclosure. Some components of the steering system 200 shown in FIG. 2A are omitted from FIG. 2B for simplicity. However, various components of the steering system 200 shown in FIG. 2A may be configured to implement the functions/components of FIG. 2B as described below in more detail. For example, functions described with respect to the RWA controller 202 may be performed/implemented by the rack position controller 224, the rack force predictor 226, etc. Similarly, functions described with respect to the HWA controller 204 may be performed/implemented by the reference torque calculator 208, the torque controller 212, etc.

As shown in FIG. 2B, the RWA controller 202 is configured to determine and provide, to the HWA controller 204, at least one of a yaw rate error and a yaw acceleration error. The yaw rate and acceleration errors indicate a difference between reference yaw rate and acceleration values (e.g., indicators of expected yaw rate/acceleration) and actual (e.g., measured or calculated) yaw rate and acceleration values, which indicate an amount of understeer or oversteer. The HWA controller 204 includes a handwheel (HW) torque modifiers calculation module 230 configured to calculate one or more HW torque modifiers (e.g., scaling factors) based on the yaw rate and acceleration errors. The HW torque modifiers are provided to the reference torque calculator 208. Although shown separate from the reference torque calculator 208, functionality associated with the HW torque modifiers calculation module 230 may be implemented within the reference torque calculator 208 and/or another component, within the RWA controller 202, etc. For example, in some examples, the raw rate and acceleration errors may be provided directly to the reference torque calculator 208, which can be configured to calculated HW torque modifiers accordingly.

For example, the reference torque calculator 208 is configured to calculate the reference torque based on various inputs, including an output of an effort function as described above (and shown at 232). Other measurements or inputs include, but are not limited to, outputs of a damping function or calculation 234 and a return correction/CVR function or calculation 236. The reference torque calculator 208 according to the present disclosure is further configured to apply the HW torque modifiers (e.g., scaling factors) to a calculated reference torque value to scale the referent torque upward or downward. In this manner, the reference torque can be scaled upward or downward in understeer and oversteer situations to modify driver feel and HW response during these situations. For example, as detected understeer (i.e., based on the yaw rate/acceleration errors) increases, an HW torque modifier may adjust the reference torque downward. Conversely, as detected overseer increases, an HW torque modifier may adjust the reference torque upward.

In this manner, the reference torque controller 208 according to the present disclosure is configured to generate and adjust the reference torque in understeer and oversteer situations (e.g., based on yaw rate error and yaw acceleration error) by obtaining and applying one or more HW torque modifiers (scaling factors).

In an example, the system 200 (e.g., the RWA controller 202) includes a linear bicycle model or other model 238 configured to generate an expected/reference yaw rate and an expected/reference yaw acceleration based on vehicle speed and roadwheel angle. The expected/reference yaw rate and acceleration may correspond to driver intended yaw rate and acceleration. Expected/reference yaw rate and yaw acceleration provide an indication of the presence of understeer or oversteer. As one example, the linear bicycle model 238 receives a vehicle speed and an input indicative of roadwheel angle, such as a corrected roadwheel angle. A steering offset correction (SOC) module (e.g., circuitry, a model, a measurement, calculation, or function, etc.) 240 may calculate the corrected roadwheel angle based on a roadwheel angle measurement, value, or signal (e.g., a roadwheel angle value obtained using a roadwheel (RW) angle calculation module 242 configured to obtain the roadwheel angle based on a rack position).

The reference yaw rate and reference yaw acceleration are provided to an understeer/oversteer (US/OS) detection module 248, which is configured to calculate the yaw rate error and the yaw acceleration error based on (i) the reference yaw rate and reference yaw acceleration and (ii) actual (e.g., measured, estimated, calculated, etc.) yaw rate and yaw acceleration. For example, yaw rate error corresponds to a difference between reference and actual yaw rates and yaw acceleration error corresponds to a difference between reference and actual yaw acceleration. Yaw rate acceleration can be calculated based on multiple samples of yaw rate. As one example, the US/OS detection module 248 receives a corrected yaw rate indicative of the actual yaw rate from a yaw rate offset correction (YOC) module 252, which is configured to calculate the corrected yaw rate based on a yaw rate measurement, signal, or value.

In an example implementation, the linear bicycle model 238 is configured to obtain a reference yaw rate $r_{LBM}$ (where "LBM" corresponds to "linear bicycle model") and a reference yaw acceleration $\dot{r}_{LBM}$. The US/OS detection module 248 calculates vehicle rotation error (e.g., yaw rate error $r_{err}$ and a yaw acceleration error $\dot{r}_{err}$) in accordance with:

$$r_{err} = \mathrm{sgn}(r_{LBM}) * (r_{LBM} - r_{act}); \text{ and}$$

$$\dot{r}_{err} = \mathrm{sgn}(\dot{r}_{LBM}) * (\dot{r}_{LBM} - \dot{r}_{act}),$$

where sgn is a signum function, $r_{act}$ is actual yaw rate, and $\dot{r}_{act}$ is actual yaw acceleration.

Based on the yaw rate error $r_{err}$ and the yaw acceleration error $\dot{r}_{err}$, a limit understeer or oversteer event can be defined within different value ranges as follows:

$r_{err}>0$, $\dot{r}_{err}\approx 0$: steady state limit understeer condition;

$r_{err}<0$, $\dot{r}_{err}\approx 0$: steady state limit oversteer condition;

$r_{err}>0$, $\dot{r}_{err}>0$: transient, increasing limit understeer condition;

$r_{err}<0$, $\dot{r}_{err}<0$: transient, increasing limit oversteer condition;

$r_{err}>0$, $\dot{r}_{err}<0$: transient, decreasing limit understeer condition; and $r_{err}<0$, $\dot{r}_{err}>0$: transient, decreasing limit oversteer condition.

The yaw rate error $r_{err}$ and the yaw acceleration error $\dot{r}_{err}$ are used to scale (e.g., using HW torque modifiers/scaling factors) effort feedback provided, via the effort function, to the driver as described above. A base effort value output/obtained using the effort function and used for handwheel (reference) torque calculation may correspond to $T_{ref,RFeffort}$. In accordance with the principles of the present disclosure, a modified base effort $T_{ref,RFeffort,\ modified}=K(r_{err},\dot{r}_{err},v)*T_{ref,RFeffort}$ can be calculated in accordance with:

$$T_{ref,RFeffort,modified} = K(r_{err}, \dot{r}_{err}, v) * T_{ref,RFeffort},$$

where K $(r_{err},\dot{r}_{err},v)$ is a calibratable scaling factor (i.e., corresponding to the HW torque modifier) for US/OS as a function of yaw rate error, yaw acceleration error, and a longitudinal velocity v. Appling the HW torque modifier directly adjusts a handwheel torque feedback target (as represented by the reference torque provided to the torque controller 212) by scaling the handwheel torque feedback target upward or downward. As one example, in a SbW system, HW torque modifiers or scalars can be applied during limit understeer and limit oversteer situations in accordance with:

for $\mathrm{sgn}(r_{LBM})=\mathrm{sgn}(r_{act})$, $r_{err}>0$: limit understeer, $0<K(r_{err},\dot{r}_{err},v)\leq 1$; and for $\mathrm{sgn}(r_{LBM})=\mathrm{sgn}(r_{act})$, $r_{err}<0$: limit oversteer, $K(r_{err},r_{err},v)\geq 1$.

In this manner, the handwheel torque feedback decreases during understeer events to amplify the effect of understeer to the driver. The corresponding reduction in steer effort is consistent with the physics-based behavior in a connected (i.e., non SbW) system. Conversely, the handwheel torque feedback increases during oversteer events to amplify the effect of oversteer to the driver. The corresponding increase in steer effort is consistent with the physics-based behavior in a connected system for an initial phase of oversteer. Further, technique considers whether the rotation of the vehicle and the rotation of the vehicle intended by the driver are in the same direction (e.g., based on the output of the linear bicycle model 238) and the sign of $r_{err}$.

In some examples, steering modification techniques of the present disclosure can be implemented in an EPS system. In these examples, the HW torque modifier may be applied as an "assist" scalar. For example, the HW torque modifiers in these examples may correspond to an inversion or inverted value relative to the HW torque modifiers described above for SbW systems. In other words, for limit understeer situations, an assist scalar greater than 1 can be used to increase assist (i.e., increase reference torque) and reduce steering effort. Conversely, for limit oversteer situations, an assist scalar less than 1 and greater than 0 can be used to decrease assist and increase steering effort.

In another example, the modifier/scaling factor K can be varied based on $r_{err}$ and $\dot{r}_{err}$ as follows:

- $r_{err}>0$, $\dot{r}_{err}\approx 0$: steady state limit understeer condition; $K_1$ $(r_{err},\dot{r}_{err},v)$;
- $r_{err}<0$, $\dot{r}_{err}\approx 0$: steady state limit oversteer condition; $K_2$ $(r_{err},\dot{r}_{err},v)$;
- $r_{err}>0$, $\dot{r}_{err}>0$: transient, increasing limit understeer condition; $K_3$ $(r_{err},\dot{r}_{err},v)$;
- $r_{err}<0$, $\dot{r}_{err}\approx 0$: transient, increasing limit oversteer condition; $K_4$ $(r_{err},\dot{r}_{err},v)$;
- $r_{err}>0$, $\dot{r}_{err}<0$: transient, decreasing limit understeer condition; $K_5$ $(r_{err},\dot{r}_{err},v)$; and
- $r_{err}<0$, $\dot{r}_{err}>0$: transient, decreasing limit oversteer condition; $K_6(r_{err},\dot{r}_{err},v)$.

Further, instead of or in addition to using yaw acceleration error to determine the modifier, steering wheel torque, steering wheel velocity, and/or other inputs may be used to determine the HW torque modifier/scaling factor.

Although these techniques are described above with respect to the rack force-based effort $T_{ref,RFeffort}$, in other examples, techniques of the present disclosure can be applied to other handwheel torques, such as damping effort and/or CVR functions/values.

For example, CVR torque can cause inaccurate/undesirable torque feedback during understeer and oversteer situations, which can interfere with driver perception steering. Accordingly, during understeer and oversteer situations, an HW torque modifier can be used to scale down/reduce CVR torque commands applied to the reference torque.

In some examples, CVR torque may be tuned to add damping to the system 200. Turning CVR off during understeer and oversteer events may result in under-damped steering, which can interfere with driver perception and steering. Accordingly, during understeer and oversteer situations, an HW torque modifier can be used to scale up/increase damping torque commands applied to the reference torque.

In some examples, damping may be tuned aggressively such that damping effects mask torque feedback during understeer and oversteer situations, which can interfere with driver perception and steering. Accordingly, during understeer and oversteer situations, an HW torque modifier can be used to scale down/reduce damping torque commands applied to the reference torque.

Accordingly, as one example, the damping or damping effort function 234 and the CVR function 236 may receive, as inputs, the yaw rate error and yaw rate acceleration and/or respective HW torque modifiers. In this manner, damping effort and CVR torque values used to adjust the reference torque can be further modified based on the yaw rate error and the yaw rate acceleration in a manner similar to the modification of the reference torque described above. As one example, the US/OS detection module 248 is configured to calculate a countersteer flag, value or other indicator that indicates whether countersteering is detected/being performed by the driver (e.g., using steering wheel sensors, reference and actual yaw values, etc.). For example, the countersteer flag may be calculated by comparing a sign of the actual yaw rate (e.g., a positive or negative sign indicating a direction of actual yaw) to a sign of the reference yaw rate (e.g., a positive or negative sign indicating a direction of intended yaw). In other words, if the actual yaw rate and reference/intended yaw rate have the same sign, the driver is not performing a countersteer maneuver. Conversely, if the actual yaw rate and reference/intended yaw rate have different (e.g., opposite) signs, the driver is performing a countersteer maneuver. Accordingly, the countersteer flag may be set, have a value of 1, etc. in response to a determination that countersteering is detected, and may not be set, have a value of 0, etc. in response to a determination that countersteering is not detected.

For example, the system 200 is configured to detect whether countersteering is present (i.e., whether the driver is performing a countersteering maneuver in which the handwheel is rotated/rotating in a position opposite a yaw of the vehicle) and selectively calculate and apply HW torque modifier/scaling value to CVR or damping torque values if countersteering is present. As one example, the HW torque modifiers calculation module 230 receives the countersteer flag and adjusts one or more HW torque modifiers further based on the countersteer flag.

Figure 3:
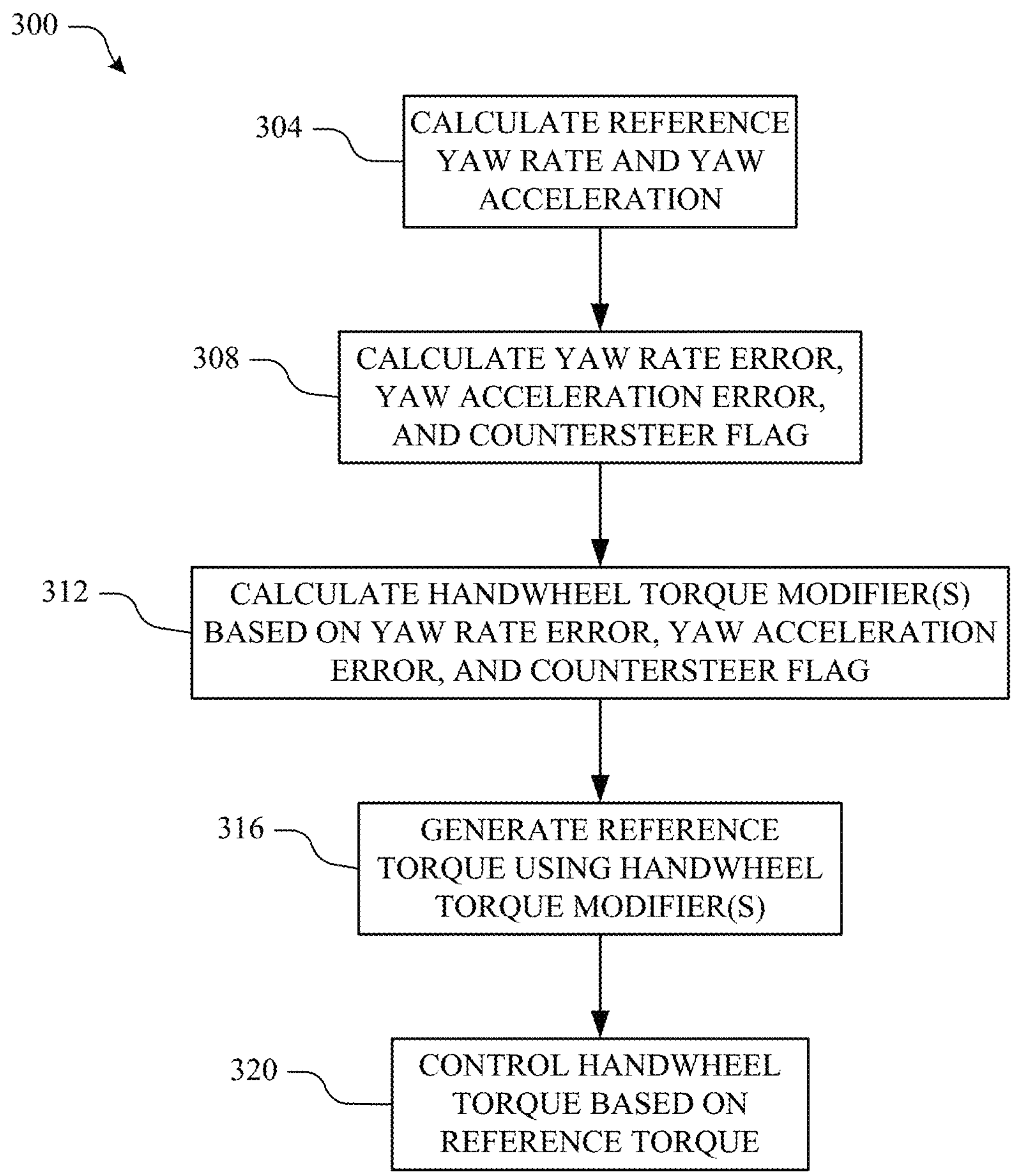
FIG. 3 is a flow diagram generally illustrating a method for performing steering modification techniques according to the principles of the present disclosure.

FIG. 3 is a flow diagram generally illustrating a method 300 for performing steering modification techniques according to the principles of the present disclosure. For example, one or more computing devices, processors, or processing devices, etc. are configured to execute instructions to implement the method 300, such as one or more of the processors of the systems described herein (e.g., a computing device or processor of a vehicle configured to implement the controller 100, the system 200, etc.). One or more of the steps of the method 300 as described below may be skipped or omitted in some examples, and/or one or more of the steps may be performed in a different sequence than described.

At 304, the method 300 includes calculating or otherwise obtaining an indicator of a rotation/yaw intended by a driver (e.g., at least one of a reference yaw rate and a reference yaw acceleration). For example, obtaining the reference yaw rate and/or the reference yaw acceleration may include calculating the reference yaw rate and the reference yaw acceleration using a linear bicycle model.

At 308, the method 300 includes determining whether the vehicle is an understeer or oversteer situation. For example, determining whether the vehicle is an understeer or oversteer situation may include calculating a yaw rate error and/or a yaw acceleration error based on a difference between the reference yaw rate and the reference yaw acceleration and/or a difference between an actual yaw rate and an actual yaw acceleration, respectively, where nonzero error values indicate understeer or oversteer. In some examples, the method 300 further includes, at 308, calculating/determining a countersteer flag indicating whether the driver is performing a countersteering maneuver as described herein.

At 312, the method 300 includes calculating one or more HW torque modifiers based at least in part on the yaw rate error and/or the yaw acceleration error. For example, a HW torque modifier may correspond to a decrease in a reference torque value for understeer situations (e.g., a multiplier less than 1.0) and an increase in the reference torque value for oversteer situations (e.g., a multiplier greater than 1.0). In some examples, the method 300 further includes, at 312, calculating the one or more HW torque modifiers based on the countersteer flag as described herein.

At 316, the method 312 includes generating a reference torque (e.g., a HW torque target) using the HW torque modifier. For example, generating the reference torque may include obtaining (e.g., using an effort function) a base effort value/torque and applying the HW torque modifier to the base effort value. In other words, generating the reference torque may include adjusting the reference torque upward or downward using the HW torque modifier.

At 320, the method 320 includes controlling handwheel torque based on the reference torque. For example, controlling the handwheel torque may include providing the reference torque to a torque controller and using the torque controller to control a HWA.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling handwheel torque in a steering system of a vehicle, the method comprising:

obtaining at least one of a reference yaw rate of the vehicle and a reference yaw acceleration of the vehicle;

obtaining at least one of a yaw rate error and a yaw acceleration error based on the at least one of the reference yaw rate and the reference yaw acceleration;

obtaining a handwheel torque modifier based on the at least one of the yaw rate error and the yaw acceleration error;

adjusting a reference torque using the handwheel torque modifier;

controlling the handwheel torque using the reference torque as adjusted using the handwheel torque modifier; and adjusting at least one of a damping torque and a return correction torque based on the at least one of the yaw rate error and the yaw acceleration error.

2. The method of claim 1, further comprising obtaining the at least one of the reference yaw rate and the reference yaw acceleration based on a roadwheel angle.

3. The method of claim 1, further comprising obtaining the at least one of the reference yaw rate and the reference yaw acceleration using a vehicle model.

4. The method of claim 1, further comprising obtaining the at least one of the yaw rate error and the yaw acceleration error based on the at least one of the reference yaw rate and the reference yaw acceleration and at least one of an actual yaw rate and an actual yaw acceleration.

5. The method of claim 1, wherein the at least one of the yaw rate error and the yaw acceleration error indicate at least one of an understeer condition and an oversteer condition of the vehicle.

6. The method of claim 5, wherein, when the at least one of the yaw rate error and the yaw acceleration error indicate the understeer condition, the handwheel torque modifier is configured to decrease the reference torque.

7. The method of claim 5, wherein, when the at least one of the yaw rate error and the yaw acceleration error indicate the oversteer condition, the handwheel torque modifier is configured to increase the reference torque.

8. The method of claim 1, wherein adjusting the reference torque using the handwheel torque modifier includes applying the handwheel torque modifier to an output of an effort function.

9. The method of claim 1, further comprising determining whether a countersteering condition is present and obtaining the handwheel torque modifier further based on whether the countersteering condition is present.

10. A system for controlling handwheel torque in a steering system of a vehicle, the system comprising:

a processor configured to execute instructions stored in memory, wherein executing the instructions causes the processor to obtain at least one of a reference yaw rate of the vehicle and a reference yaw acceleration of the vehicle, obtain at least one of a yaw rate error and a yaw acceleration error based on the at least one of the reference yaw rate and the reference yaw acceleration, obtain a handwheel torque modifier based on the at least one of the yaw rate error and the yaw acceleration error, adjust a reference torque using the handwheel torque modifier, control the handwheel torque using the reference torque as adjusted using the handwheel torque modifier, and adjust at least one of a damping torque and a return correction torque based on the at least one of the yaw rate error and the yaw acceleration error.

11. The system of claim 10, wherein the processor is configured to obtain the at least one of the reference yaw rate and the reference yaw acceleration based on a roadwheel angle.

12. The system of claim 10, wherein the processor is configured to obtain the at least one of the reference yaw rate and the reference yaw acceleration using a vehicle model.

13. The system of claim 10, wherein the processor is configured to obtain the at least one of the yaw rate error and the yaw acceleration error based on the at least one of the reference yaw rate and the reference yaw acceleration and at least one of an actual yaw rate and an actual yaw acceleration.

14. The system of claim 10, wherein the at least one of the yaw rate error and the yaw acceleration error indicate at least one of an understeer condition and an oversteer condition of the vehicle.

15. The system of claim 14, wherein, when the at least one of the yaw rate error and the yaw acceleration error indicate the understeer condition, the handwheel torque modifier is configured to decrease the reference torque.

16. The system of claim 14, wherein, when the at least one of the yaw rate error and the yaw acceleration error indicate the oversteer condition, the handwheel torque modifier is configured to increase the reference torque.

17. The system of claim 10, wherein adjusting the reference torque using the handwheel torque modifier includes applying the handwheel torque modifier to an output of an effort function.

18. A system for controlling a handwheel torque of a steering system of a vehicle, the system comprising:

a roadwheel actuator controller configured to (i) obtain at least one of a reference yaw rate of the vehicle and a reference yaw acceleration of the vehicle and (ii) obtain at least one of a yaw rate error and a yaw acceleration error based on the at least one of the reference yaw rate and the reference yaw acceleration; and a handwheel actuator controller configured to (i) obtain a handwheel torque modifier based on the at least one of the yaw rate error and the yaw acceleration error, (ii) adjust a reference torque using the handwheel torque modifier, and (iii) control the handwheel torque using the reference torque as adjusted using the handwheel torque modifier, wherein the handwheel actuator controller is configured to use the handwheel torque modifier to (i) decrease the reference torque in response to a determination that the at least one of the yaw rate error and the yaw acceleration error indicates that the vehicle is in an understeer condition, (ii) increase the reference torque in response to a determination that the at least one of the yaw rate error and the yaw acceleration error indicates that the vehicle is in an oversteer condition, and (iii) adjust at least one of a damping torque and a return correction torque based on the at least one of the yaw rate error and the yaw acceleration error.

* * * * *